Patented Aug. 22, 1939

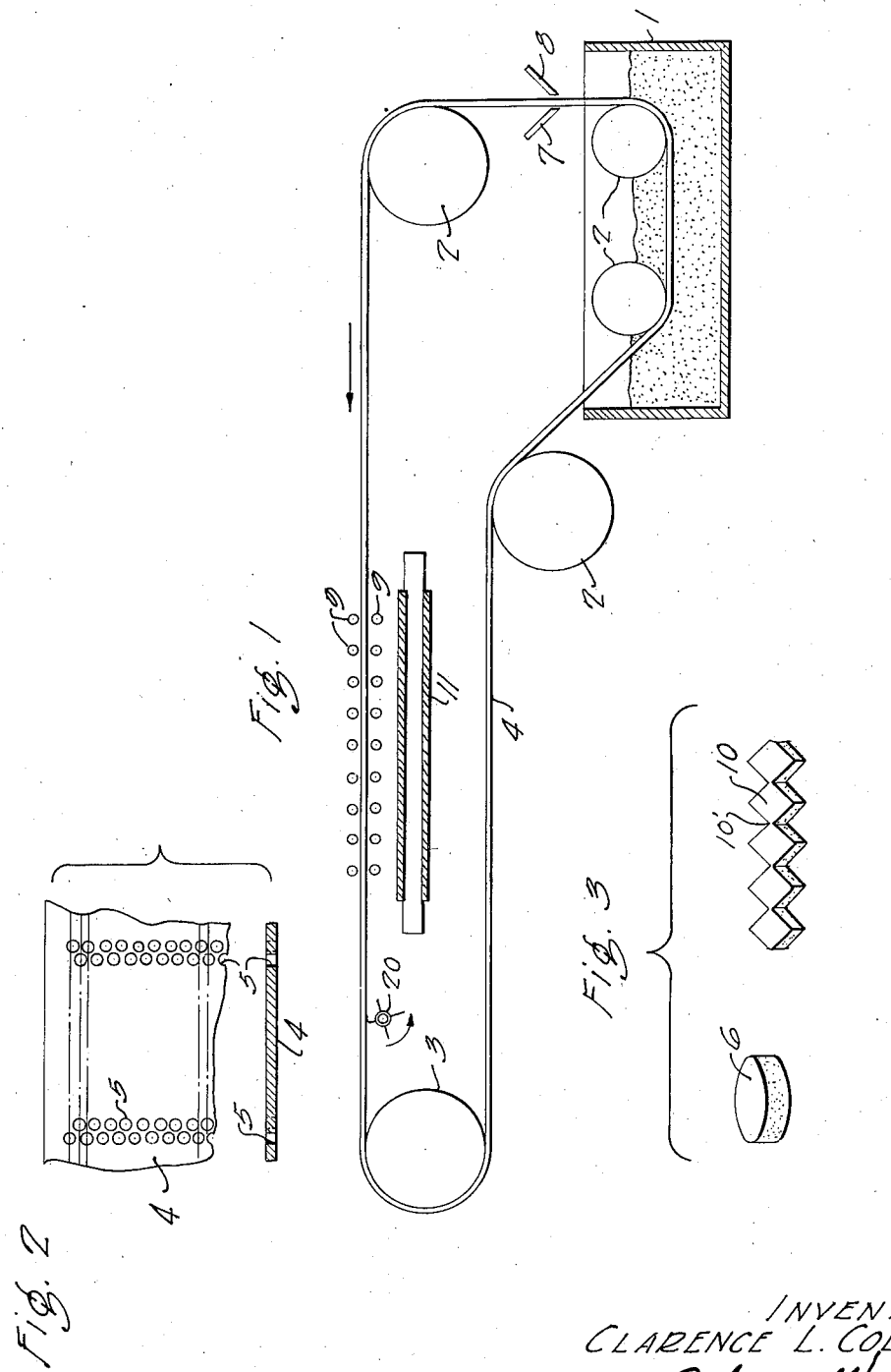

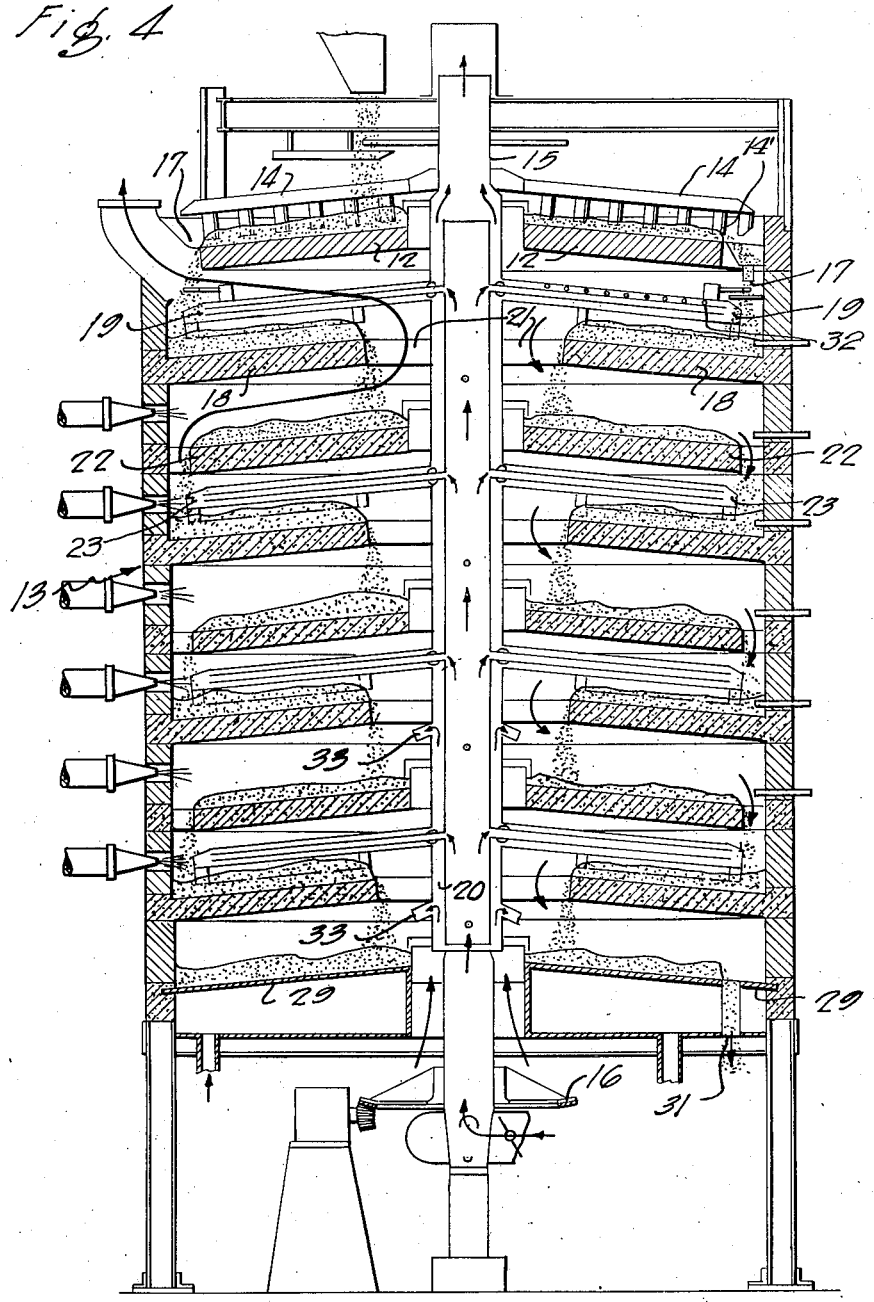

2,170,445

UNITED STATES PATENT OFFICE 2,170,445

ROOFING GRANULE AND METHOD OF MAKING

Clarence L. Colbert, Elizabeth, N. J., assignor, by mesne assignments, to Empire Trust Company, New York, N. Y., a corporation of New York, as trustee Application July 14, 1931, Serial No. 550,637

11 Claims. (Cl. 25—156)

The present invention provides roofing granules, which are of a definite size or range of sizes and of predetermined composition and consistency, and a method of making the same.

The manufacture and use of granular materials for applying to roofing materials such as shingles, sheet roofing and the like, is becoming more and more exacting in the specifications and requirements with which the products must comply. It is not only essential that the grains shall adhere firmly to the roofing material, resist weathering, fire and mechanical abrasion, but they must also be bright colored and present a range of different colors and in some cases the colors must be reproducible. It is also desirable that the color of the granule may not only be predetermined but that it shall be uniform throughout each individual granule.

An object of the present invention, accordingly, is to provide a method of making colored granules whereby the size, color, and texture or consistency of the same may be definitely controlled and reproduced. It is also an object to produce granules which are characterized, in a given lot, by uniformity of size, color and shape, and by uniformity of composition and physical characteristics. Other objects will appear from the following disclosure.

In accordance with the method of the invention, a suitable ceramic material, such as brick clay or shale, is first reduced to a uniformly finely divided condition, (relative to the size of the granules to be produced) and then mixed with water to form a relatively thick, plastic mass, (preferably using no more water than is necessary for the sake of uniformity) followed by filling the mass into the apertures of a forming member, such as a perforated metal plate, drying the deposits of plastic material and/or subjecting the same directly to a firing and hardening temperature, with or without vitrification as desired. The shaped masses are thus hardened, and their shape and size substantially preserved in the finished product.

Other modes of shaping the plastic mixture may be adopted in practice, as for example by passing the same through a cylindrical tube which is mounted with its axis inclined to the horizontal and rotated and heated thereby to dry and tumble the material, which tends to disintegrate and to aggregate into granules which are rounded and also relatively dense.

A typical instance of practice of the invention will be described with reference to the manufacture of granules suitable for application to roofing and siding materials, by means of apparatus shown in the accompanying drawings, in which:

Fig. 1 is a diagrammatic side elevation of apparatus suitable for carrying out the invention;

Fig. 2 is a plan view of a section of a perforated belt suitable for shaping the plastic material;

Fig. 3 is a view of granules made therefrom; and

Fig. 4 is a cross section of a multiple hearth furnace for firing the granules.

In carrying out the invention, a suitable raw material is first chosen, such as hard clay or shale, preferably of high maturing temperature if an open textured granule is desired or more plastic material of low fusing point if a dense granule is required, and reduced to uniform particle size of fine grains or dust, or mixtures of such states of subdivision, as for example 14 mesh and finer. The finer sizes may be constantly removed and the coarser sizes returned for regrinding or the whole charge may be reduced to a fine powder, if desired, and this is in some instances to be desired as when the raw material is extremely friable or when it is found to facilitate the shaping and handling of the mass.

At this stage additional coloring matter, preferably in the form of a finely divided pigment, may be added. This may be effected in dry, powdery condition or in the form of fluid suspensions of either the plastic material or the pigment or both. The coloring matter may also be in the form of a solution of soluble salts.

The ground material is now mixed with water, if the grinding has been effected dry, in sufficient amount thoroughly to wet the entire mass and render it plastic. If ground wet it may be of the right consistency or adjusted accordingly. Excess of water is to be avoided, however, inasmuch as it requires heat in subsequently drying and firing and also because a relatively stiff mixture usually facilitates the shaping and handling of the wet mass.

The plastic mass thus obtained is charged into the tank or reservoir 1 and may be agitated therein by suitable mixing equipment or by hand. Through the tank 1 and carried by guide rolls 2, 2, and 3 is a perforated (or embossed) belt 4 which contacts with or passes through the body of the charge. The perforations 5 (or embossed depressions) may be large or small but have a relatively shallow depth or thickness, of the order of ⅛" as indicated in Fig. 2. The shape of the molded granules 6 may be round, as shown in Fig. 3, or of other convenient shape, as shown at 10—designed for example to promote lines of weakness along which subsequent cracking or spalling of the granule will occur. This may be provided where the initial size of the mold is made larger than the desired granule and where it is desired that a rough, irregularly fractured surface be provided. For example, the perforations or embossed depressions may be triangular, in which case the points of the molded granule will tend to be broken off, or in long strips 10 with notched edges 10', which will tend to crack transversely into smaller units. Likewise they may be molded in various other flat, elongated shapes.

As the belt passes into the tank it contacts with the plastic mixture, preferably under slight pressure tending thereby to force the clay into the depressions or perforations of its surface, and fill them. As the belt leaves the tank, both surfaces of the belt are wiped free from residual adhering material, as by a pair of doctor blades or wipers 7, 8. The belt with its openings filled with the clay mixture is next passed through or over a hot blast of air which may be provided, as in the instant case, by a row of gas or oil burners 9. The intense heat dries the clay, causing it to shrink rapidly and draw away from the walls of the belt, so that the sheets, strips or pellets of clay therein harden somewhat and drop out.

If for any reason the granules do not fall freely out of the perforations of the belt, a rapping device 20 may be provided. In case the belt is thin and flexible, the flexing action of bending the belt sharply about one of the guide rolls or driving rolls 2, 3 may further facilitate their removal.

A conveyor belt 11, passing beneath and transversely of the belt 4 collects the dried and shaped granules of clay and conveys them to the top hearth 12 of the multiple hearth furnace 13, (Fig. 4). Here the granules are spread out by rotating rakes or arms 14 mounted upon a central shaft 15 and driven from below by gears 16 and any suitable power means. The granules are directed outwardly toward the periphery of the hearth 12, where they fall through an opening 17 upon the inner hearth 18. Similar rakes 19 on this hearth gradually feed the granules to and through a central opening 21 to a second hearth 22 where they are again carried toward the periphery by rotating rakes 23 (which are at right angles and hence not shown). And similarly the granules pass from hearth to hearth to the bottom hearth 29, from which they are ultimately withdrawn through a gate 31.

The hearths may be severally heated by oil burners 20 mounted in the side walls of the furnace 13, or by gas, to temperatures indicated by pyrometers 30 likewise mounted in the walls of the furnace at suitably spaced intervals above each of the hearths. Oxidizing conditions may be provided by passing air through other openings in the walls of the furnace (not shown) or through ports 32 in the arms of the rabbles 23 or through the central openings 33.

As the green granules are conveyed to the furnace—if they are already of the size and shape ultimately desired—some care should be exercised to avoid their further comminution. Thus, they should not be dropped an appreciable distance onto the conveyor belt nor caused to tumble against each other thereon; and when delivered to the hearth of the furnace they should be gradually and gently fed thereacross. Alternatively, they may be delivered directly into the opening 17 upon the heated inner hearth so that they shall develop greater strength before further handling is encountered.

On the other hand, if the material is molded into larger strips or sheets than the granules which are ultimately to be produced therefrom, agitation of the green molded shapes may be desired so as to insure further fracturing. This may be assured by providing additional arms upon the top hearth of the furnace and by having the vanes 14' thereon so directed as to have a vigorous mechanical action upon the granules. By providing planes of positive weakness in the larger, thin shapes, as above described, their fracture to produce a definite, unitary size and shape of granule may be made relatively certain by such means. It is further promoted, however, by subjecting the granules directly to a relatively high temperature, whereupon any moisture retained by the larger pieces rapidly expands and opens up such planes of weakness.

On account of the relatively small but uniform size of the green granules thus subjected to the roasting or firing treatment, the heat effect upon each granule of a given charge is substantially identical. Consequently, not only are they brought to a uniform degree of heat throughout each granule but all the granules of the batch will have substantially the same density, degree of hardness, surface characteristics and color. When the qualities and properties of the finished granule are determined upon and the corresponding composition of material and conditions of time, temperature and atmosphere of the furnace suitably adjusted, uniform suitability of the product may be relied upon.

Thus with Watsontown shale (from Watsontown Valley, Pennsylvania) which has been pulverized to 14 mesh and finer and molded into shapes approximately 1/8" in diameter and fired in the furnace at temperatures of approximately 1750° F., for a throughput period of an hour, a very satisfactory, densely porous granule is obtained, which is naturally red in color (but with which additional coloring matter may be mixed) and has a rough surface well adapted for adhesion to plastic materials.

With a more refractory, white burning clay, such as that found at Darlington, Pennsylvania, suitable coloring material such as finely ground green chromium oxide may be added to the wet mix to give the desired color, and the molded granule subjected to a furnace temperature of 2000 to 2050° F., for about the same length of time. The product is a dense, rough, green granule.

Somewhat higher temperatures than those given may be employed if a harder vitrification or denser granule is desired, and other coloring agents, either natural or artificially prepared, may be used.

Glazes or other filling or coating materials may be applied to the granules, if desired. While such surfaces are ordinarily not desired on granules on account of their lowered adhesiveness to the materials upon or in which they are ultimately to be incorporated, they may be advantageously provided by the present invention. For example, such materials may be applied to the molded grains while they are in the green condition, either before or after drying. In such application the material to be added may be in the form of a solution of a finely divided powder or suspension and distributed upon the exposed surface of the granule before removal from the perforated belt. The treated granule will thus have the coating material on its broad face (or faces) but not on the other surfaces.

It should be understood that the present disclosure is for the purpose of illustration only and that this invention includes all modifications and equivalents which fall within the scope of the appended claims.

I claim:

1. Method of making roofing granules, which comprises as steps reducing a raw clay or shale to finely divided condition, mixing with water to form a plastic mass, forming the same into thin sheets, breaking to a granular form, and subjecting to a firing temperature to harden the same.

2. Method of making roofing granules, which comprises as steps reducing a raw clay or shale to finely divided condition, mixing with water, to form a plastic mass, and with coloring matter, forming the same into thin sheets, drying, breaking to granular form, and subjecting to a firing temperature to develop the desired color of the coloring matter.

3. Method of making roofing granules which comprises as steps reducing a raw clay or shale to finely divided condition, mixing with water to form a plastic mass, forming the same into thin sheets one-eighth inch thick or less and having predetermined planes of weakness therein breaking to granular form, and subjecting to a firing temperature.

4. Method of making roofing granules which comprises as steps reducing a raw clay or shale to finely divided condition, mixing with water to form a plastic mass, forming the same into thin sheets one-eighth inch thick or less and having predetermined planes of weakness, drying, rupturing along said planes, and subjecting to a firing temperature.

5. A flat granule formed of burned clay artificially colored throughout the granule and having a shape similar to a slate granule in that its top and bottom surfaces are substantially parallel, the thickness of the granule between said surfaces being less than its length along said surfaces.

6. The method of making a flat granule which comprises forming from plastic clay a sheet the thickness of which is substantially the thickness desired between the flat sides of the finished granule, drying said sheet to a relatively brittle state, breaking up said sheet into granules, and burning such granules as are of proper size to the desired degree of hardness and insolubility.

7. The method set forth in claim 6 in which a suitable coloring matter is mixed into the clay prior to its original drying.

8. The method of making a flat granule which comprises forming a body of plastic clay, the thickness of which is substantially the thickness which after burning will yield the thickness desired between the flat sides of the finished granule, partially drying said sheet to a condition in which it may be broken up, breaking up said sheet into granules, and hardening such of said granules as are of proper size to the desired degree of hardness and insolubility.

9. The method of making a flat granule which comprises forming a body of plastic clay, the thickness of which is substantially the thickness desired between the flat sides of the finished granule, partially drying said sheet to a condition in which it may be broken up, breaking up said sheet into granules, and burning such granules as are of proper size to the desired degree of hardness and insolubility.

10. Method of making roofing granules, which comprises the steps of reducing a raw clay or shale to finely divided condition, mixing with water and coloring matter to form a plastic mass, forming the same into thin sheets, breaking to granular form, and subjecting to a firing temperature to harden the same and develop the desired color of the coloring matter.

11. A flat granule formed of burned shale artificially colored throughout the granule and having a shape similar to a slate granule in that its top and bottom surfaces are substantially parallel, the thickness of the granule between said surfaces being less than its length along said surfaces.

CLARENCE L. COLBERT.